United States Patent
Galizio

(10) Patent No.: US 10,584,235 B2
(45) Date of Patent: *Mar. 10, 2020

(54) METHODS FOR PREPARING TIRE TREADS WITH ADVANTAGEOUS WEAR CHARACTERISTICS

(71) Applicant: Bridgestone Americas Tire Operations, LLC, Nashville, TN (US)

(72) Inventor: Benjamin C. Galizio, Kent, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 247 days.

This patent is subject to a terminal disclaimer.

(21) Appl. No.: 15/502,419

(22) PCT Filed: Jul. 28, 2015

(86) PCT No.: PCT/US2015/042372
§ 371 (c)(1),
(2) Date: Feb. 7, 2017

(87) PCT Pub. No.: WO2016/032661
PCT Pub. Date: Mar. 3, 2016

(65) Prior Publication Data
US 2017/0233558 A1 Aug. 17, 2017

Related U.S. Application Data

(60) Provisional application No. 62/042,866, filed on Aug. 28, 2014.

(51) Int. Cl.

| | |
|---|---|
| *C08L 9/06* | (2006.01) |
| *B60C 1/00* | (2006.01) |
| *C08J 3/20* | (2006.01) |
| *C08K 5/3432* | (2006.01) |
| *C08K 3/36* | (2006.01) |
| *C08K 9/00* | (2006.01) |
| *C08J 3/24* | (2006.01) |
| *C08J 3/00* | (2006.01) |

(52) U.S. Cl.
CPC .............. *C08L 9/06* (2013.01); *B60C 1/0016* (2013.01); *C08J 3/005* (2013.01); *C08J 3/203* (2013.01); *C08J 3/241* (2013.01); *C08K 3/36* (2013.01); *C08K 5/3432* (2013.01); *C08K 9/00* (2013.01); *C08J 2307/00* (2013.01); *C08J 2309/06* (2013.01); *C08J 2315/02* (2013.01)

(58) Field of Classification Search
CPC .......... C08L 9/06; C08L 91/00; B60C 1/0016; C08K 3/36; C08K 5/3432; C08J 3/005; C08J 3/241
USPC .................... 523/156; 524/492; 264/349
See application file for complete search history.

(56) References Cited

U.S. PATENT DOCUMENTS

| | | | |
|---|---|---|---|
| 4,786,680 A | 11/1988 | Suzuki et al. | |
| 4,822,844 A | 4/1989 | Kawakami et al. | |
| 5,017,636 A | 5/1991 | Hattori et al. | |
| 5,504,137 A * | 4/1996 | Sandstrom | C08K 5/3432 524/492 |
| 5,534,574 A | 7/1996 | Sandstrom et al. | |
| 5,711,904 A * | 1/1998 | Eswaran | B29C 47/1063 264/211.23 |
| 6,220,323 B1 | 4/2001 | Sandstrom et al. | |
| 8,765,844 B2 | 7/2014 | Masumoto | |
| 2002/0082334 A1 | 6/2002 | Kobayashi et al. | |
| 2004/0152811 A1 | 8/2004 | Lin et al. | |
| 2008/0132608 A1 | 6/2008 | Inoue | |
| 2010/0105805 A1 | 4/2010 | Sasaka | |
| 2012/0053300 A1 | 3/2012 | Zhao et al. | |

OTHER PUBLICATIONS

EPO, Supplementary European Search Report, European Application No. EP 15 83 6058, dated Jan. 26, 2018.

* cited by examiner

*Primary Examiner* — Doris L Lee
(74) *Attorney, Agent, or Firm* — Meredith E. Hooker; Arthur Reginelli

(57) ABSTRACT

A method for preparing a vulcanizable composition of matter, the method comprising mixing, within a first mixing step, rubber, silica, and silica coupling agent to form a first masterbatch composition, adding nicotinamide to the first masterbatch composition and mixing within a second mixing step to form a second masterbatch composition, and adding a curative to the second masterbatch composition and mixing within a final mixing step.

12 Claims, No Drawings

METHODS FOR PREPARING TIRE TREADS WITH ADVANTAGEOUS WEAR CHARACTERISTICS

FIELD OF THE INVENTION

Embodiments of the present invention are directed toward methods for preparing tire treads with advantageous wear characteristics. According to one or more embodiments of the invention, rubber, silica, and silica coupling agent are mixed in a first mixing step, and following this first mixing step, nicotinamide is added to the composition and mixed in a second mixing step prior to the introduction of a curative.

BACKGROUND OF THE INVENTION

In the art of making tire components, especially tire treads, silica has been employed as a filler to provide, among other benefits, advantageous wear characteristics. The silica is employed in conjunction with a silica coupling agent that chemically links the silica to the rubber. For example, mercaptosilanes have been employed as coupling agents whereby the mercapto unit reacts with unsaturation within the rubber and the silane unit reacts with the surface of the silica particle through a condensation reaction. The prior art, such as U.S. Publ. No. 2004/0152811, teaches that strong bases, such as diphenyl guanidine, can promote this condensation reaction and lead to improved results. These strong bases, however, also act as accelerators for sulfur curing of the rubber, and therefore the use of these strong bases must be carefully tailored so as not to deleteriously impact cure properties.

The prior art also proposes the use of nicotinamide as a cure accelerator during sulfur curing of vulcanizable compositions. For example, U.S. Pat. No. 5,504,137 teaches the addition and mixing of nicotinamide, together with sulfur at temperatures or mixing energies that are consistent with mixing conditions where curative is present (i.e., productive mixing). The prior art does not, however, teach or appreciate any benefits that may be associated with the mixing of nicotinamide in a masterbatch or non-productive mixing step.

SUMMARY OF THE INVENTION

One or more embodiments of the present invention provide a method for preparing a vulcanizable composition of matter, the method comprising mixing, within a first mixing step, rubber, silica, and silica coupling agent to form a first masterbatch composition, adding nicotinamide to the first masterbatch composition and mixing within a second mixing step to form a second masterbatch composition, and adding a curative to the second masterbatch composition and mixing within a final mixing step.

DETAILED DESCRIPTION OF ILLUSTRATIVE EMBODIMENTS

Introduction

Embodiments of the invention are based, at least in part, on the discovery of a mixing process for the preparation of vulcanizable compositions useful for preparing tire treads. According to these processes, rubber, silica, and silica coupling agent are mixed in a first mixing step, nicotinamide is added and mixed in a second mixing step, and then curative is added and mixed in a final mixing step. Tire treads produced from these vulcanizable compositions show advantageous wear characteristics. While the prior art proposes use of nicotinamide as a cure accelerator, the wear characteristics obtained by practice of the present invention were unexpected. Indeed, the prior art fails to even suggest the addition of nicotinamide to a masterbatch mixing step after silica addition, let alone the unexpected advantages achieved when rubber, silica, and silica coupling agent are first mixed, and then the nicotinamide is subsequently introduced and mixed prior to introduction of curative.

Mixing Procedure

In one or more embodiments, the process of the present invention includes a first mixing step wherein rubber, silica, and a silica coupling agent are mixed to produce a first mixture. Nicotinamide is then added to this first mixture and mixing is continued in a second mixing step. A curative is then added to the composition and mixing is continued in a final mixing step. Other ingredients that are conventional in making vulcanizable compositions for tire treads may also be included in one or more of these mixing steps. For example, together with the rubber, silica, and silica coupling agent, carbon black, processing oil, processing aids such as zinc oxide and fatty acid, and antidegradents such as antioxidants or antiozonants may also be included in the first mixing step. Also, together with the introduction of a curative, various cure accelerators and/or cure retarders may be included in the final mixing step.

In one or more embodiments, at the conclusion of the masterbatch mixing step, the composition is allowed to cool prior to the final mixing step. In practice, this typically includes dropping the composition from the mixer and allowing the composition to cool and then the composition is reintroduced to the mixer for the final mixing step. In one or more embodiments, after the masterbatch mixing step, the composition is allowed to cool to temperatures below 130° C., in other embodiments below 100° C., in other embodiments below 70° C., and in other embodiments below 30° C. In one or more embodiments, the composition is allowed to cool under standard conditions of temperature and pressure for at least 1 hour, in other embodiments at least 6 hours, and in other embodiments at least 12 hours.

First Mixing Step

As suggested above, the first mixing step includes mixing rubber, silica, and silica coupling agent. This first mixing step may also be referred to as a first masterbatch mixing step or as a first non-productive mixing step.

In one or more embodiments, the rubber, silica, and a silica coupling agent are generally introduced at the same time and mixed for generally the same amount of time under similar conditions. The product that results from the first mixing step may be referred to as the first masterbatch composition.

In other embodiments, two or more of the rubber, silica, and silica coupling agent are mixed in a first sub-step, and the other ingredients are then subsequently added, and mixing is continued as part of the first mixing step. In other words, the first mixing step can be divided into sub-steps. It is understood, however, that the nicotinamide is not introduced during the first mixing step or any sub component thereof. In one or more embodiments, the composition mixed in the first mixing step is devoid or substantially devoid of nicotinamide.

In one or more embodiments, the first mixing step, or one or more sub-steps of the first mixing step, may be characterized by the peak temperature obtained by the composition during the mixing. This peak temperature may also be referred to as a drop temperature. In one or more embodiments, the peak temperature of the composition during the first mixing step may be at least 140, in other embodiments at least 150, and in other embodiments at least 160° C. In these or other embodiments, the peak temperature of the composition during the first mixing step may be from about 140 to about 200, in other embodiments from about 150 to about 190, and in other embodiments from about 160 to about 180° C.

Second Mixing Step

Following the first mixing step, nicotinamide is added to the composition (i.e., the first masterbatch composition), and mixing is continued in a second mixing step. This second mixing step may be referred to as a second masterbatch mixing step or as a second non-productive mixing step.

In one or more embodiments, nicotinamide may be introduced to the composition together with other ingredients as part of the second mixing step. For example, additional filler (e.g., silica) and/or a silica coupling agent can also be introduced to the composition as part of the second mixing step. These additional ingredients may be added simultaneously with the nicotinamide or sequentially therewith (i.e., before or after addition of the nicotinamide). Where additional ingredients are added sequentially, reference may be made to sub-steps within the second mixing step. For example, nicotinamide may be added first, and then silica coupling agent may be subsequently added. Reference may therefore be made to a first sub-step within the second mixing step wherein nicotinamide is added and a second sub-step of the second mixing step wherein silica coupling agent is added. In any event, the product that results from the second mixing step may be referred to as the second masterbatch composition.

In one or more embodiments, the second mixing step, or one or more sub-steps of the second mixing step, may be characterized by the peak temperature obtained by the composition during the mixing. This peak temperature may also be referred to as a drop temperature. In one or more embodiments, the peak temperature of the composition during the second mixing step may be at least 140, in other embodiments at least 150, and in other embodiments at least 160° C. In these or other embodiments, the peak temperature of the composition during the second mixing step may be from about 140 to about 200, in other embodiments from about 150 to about 180, and in other embodiments from about 160 to about 180° C.

In one or more embodiments, the amount of nicotinamide added as part of the second masterbatch mixing step may be described based upon the rubber present within the composition, which rubber is introduced during the first mixing step, plus any additional rubber that may be added during the second mixing step. In one or more embodiments, the amount of nicotinamide introduced as part of the second mixing step may be at least 0.5, in other embodiments at least 1.0, and in other embodiments at least 1.5 parts by weight nicotinamide per 100 phr. In these or other embodiments, the amount of nicotinamide introduced as part of the second mixing step may be at most 3.3, in other embodiments at most 3.0, and in other embodiments at most 2.8 parts by weight nicotinamide per 100 phr. In one or more embodiments, the amount of nicotinamide added as part of the second mixing step may be from about 0.5 to about 3.3, in other embodiments from about 1.0 to about 3.0, and in other embodiments from about 1.5 to about 2.8 parts by weight nicotinamide per 100 phr.

Final Mixing Step

Following the second mixing step, a curative or curative system is introduced to the composition and mixing is continued to ultimately form the vulcanizable composition of matter. This mixing step may be referred to as the final mixing step, the curative mixing step, or the productive mixing step. The resultant product from this mixing step may be referred to as the vulcanizable composition.

In one or more embodiments, the final mixing step may be characterized by the peak temperature obtained by the composition during final mixing. As the skilled person will recognize, this temperature may also be referred to as the final drop temperature. In one or more embodiments, the peak temperature of the composition during final mixing may be at most 130, in other embodiments at most 110, and in other embodiments at most 100° C. In these or other embodiments, the peak temperature of the composition during final mixing may be from about 80 to about 130, in other embodiments from about 90 to about 115, and in other embodiments from about 95 to about 105° C.

Ingredients

Rubber

In one or more embodiments, the rubber, which may also be referred to as a vulcanizable rubber or elastomer, may include those polymers that can be vulcanized to form compositions possessing rubbery or elastomeric properties. These elastomers may include natural and synthetic rubbers. The synthetic rubbers typically derive from the polymerization of conjugated diene monomer, the copolymerization of conjugated diene monomer with other monomer such as vinyl-substituted aromatic monomer, or the copolymerization of ethylene with one or more α-olefins and optionally one or more diene monomers.

Exemplary elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched, and star-shaped structures. These elastomers may also include one or more functional units, which typically include heteroatoms Silica Silica useful as filler within the vulcanizable compositions of the invention are generally well-known. Examples of Examples of suitable silica reinforcing filler include, but are not limited to, precipitated amorphous silica, wet silica (hydrated silicic acid), dry silica (anhydrous silicic add), fumed silica, calcium silicate, and the like. Other suitable fillers include aluminum silicate, magnesium silicate, and the like. Among these, precipitated amorphous wet-process, hydrated silicas are preferred.

In particular embodiments, the silica is a precipitated amorphous wet-processed hydrated silica. In one or more embodiments, these silicas are produced by a chemical reaction in water, from which they are precipitated as ultra-fine, spherical particles. These primary particles are believed to strongly associate into aggregates, which in turn combine less strongly into agglomerates.

Some commercially available silicas which may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

In one or more embodiments, silicas may be characterized by their surface areas, which give a measure of their reinforcing character. The Brunauer, Emmet and Teller ("BET") method (described in *J. Am, Chem. Soc.*, vol. 60, p. 309 et seq.) is a recognized method for determining the surface area. The BET surface area of silica is generally less than 450 m$^2$/g. Useful ranges of surface area include from about 32 to about 400 m$^2$/g, about 100 to about 250 m$^2$/g, and about 150 to about 220 m$^2$/g.

In one or more embodiments, the pH of silica may be from about 5 to about 7 or slightly over 7, or in other embodiments from about 5.5 to about 6.8.

Silica Coupling Agent

In one or more embodiments, the silica coupling agent is a sulfur-containing silica coupling agent. Examples of sulfur-containing silica coupling agents include bis(trialkoxysilylorgano)polysulfides or mercapto-organoalkoxysilanes. Types of bis(trialkoxysilylorgano)polysulfides include bis(trialkoxysilylorgano)disulfide and bis(trialkoxysilylorgano)tetrasulfides.

Exemplary bis(trialkoxysilylorgano)disulfide silica coupling agents suitable for use in the invention include, but are not limited to, 3,3'-bis(triethoxy-sily-propyl)disulfide, 3,3'-bis(trimethoxysily-propyl)disulfide, 3,3'-bis(tributoxysilylpropyl)disulfide, 3,3'-bis(tri-m-butoxysilylpropyl)disulfide, 3,3'-bis(trihexoxysilyl-propyl)disulfide, 2,2'-bis(dimethylmethoxysilylethyl)disulfide, 3,3'-bis(diphenyl-cyclohexoxysilylpropyl)disulfide, 3,3'-bis(ethyl-di-sec-butoxysilylpropyl)disulfide, 3,3'-bis(propyldiethoxysilylpropyl)disulfide, 12,12'-bis(triisopropoxysilylpropyl)disulfide, 3,3'-bis(dimethoxyphenylsilyl-2-methylpropyl)disulfide, and the like, and mixtures of any of the foregoing.

Exemplary bis(trialkoxysilylorgano)tetrasulfide silica coupling agents suitable for use in the invention include, but are not limited to, bis(3-triethoxysilylpropyl)tetrasulfide, bis(2-triethoxysilylethyl)tetrasulfide, bis(3-trimethoxysilylpropyl)tetrasulfide, 3-trimethoxysilylpropyl-N,N-dimethylthio-carbamoyl tetrasulfide, 3-triethoxysilylpropyl-N,N-dimethylthiocarbamoyl tetra-sulfide, 2-triethoxysilyl-N,N-dimethylthiocarbamoyl tetrasulfide, 3-trimethoxysilylpropylbenzothiazole tetrasulfide, 3-triethoxysilylpropylbenzothiazole tetrasulfide, and the like, and mixtures of any of the foregoing. Particularly preferred is bis(3-triethoxysilylpropyl)tetrasulfide.

Chemically-Treated Inorganic Oxide

In one or more embodiments, a chemically-treated inorganic oxide may be used in addition to or in lieu of silica and/or coupling agent. In one or more embodiments, the chemically-treated inorganic oxide employed in the practice of the present invention is known as described in U.S. Pat. Nos. 6,342,560, 6,649,684, 7,569,107, 7,687,107, and 7,704,552, which are incorporated herein by reference. Also, chemically-treated inorganic oxides are commercially available under the tradenames Agilon™ 454 silica, Agilon™ 400 silica, Agilon™ and 458 Silica (PPG Industries).

In one or more embodiments, the chemically-treated inorganic oxide, which may include an amorphous or particulate inorganic oxide, may be characterized by a carbon content of greater than 1 weight percent, a sulfur content of greater than 0.1 weight percent, a Silane Conversion Index (described hereinafter) of at least 0.3 and a Standard Tensile Stress @300% elongation (also described hereinafter) of 7 or more can be prepared. The process described in U.S. Pat. No. 5,908,660, which is incorporated herein, may be improved and used to produce the modified filler of the present invention by utilizing a certain combination of functionalizing and hydrophobizing agents in an aqueous suspension of inorganic oxide having a pH of 2.5 or less and treating the acidic aqueous suspension of modified fillers with acid neutralizing agents to increase the pH of the suspension to a range of from 3.0 to 10.

Nicotinamide

Nicotinamide is a well-known compound and may also be referred to as nicocynamide or niacynamide, nicotinicamide, or pyridine-3-carboxamide. Nicotinamide is identified by CAS No. 98-92-0.

Curatives

A multitude of rubber curing agents (also called vulcanizing agents) may be employed, including sulfur or peroxide-based curing systems. Curing agents are described in Kirk-Othmer, ENCYCLOPEDIA OF CHEMICAL 7TECHNOLOGY, Vol. 20, pgs. 365-468, (3$^{rd}$ Ed. 1982), particularly *Vulcanization Agents and Auxiliary Materials*, pgs. 390-402, and A. Y. Coran, *Vulcanization*, ENCYCLOPEDIA OF POLYMER SCIENCE AND ENGINEERING, (2$^{nd}$ Ed. 1989), which are incorporated herein by reference. In one or more embodiments, the curative is sulfur. Examples of suitable sulfur vulcanizing agents include "rubbermaker's" soluble sulfur; sulfur donating vulcanizing agents, such as an amine disulfide, polymeric polysulfide or sulfur olefin adducts; and insoluble polymeric sulfur. Vulcanizing agents may be used alone or in combination. The skilled person will be able to readily select the amount of vulcanizing agents to achieve the level of desired cure.

In one or more embodiments, the curative is employed in combination with a cure accelerator. In one or more embodiments, accelerators are used to control the time and/or temperature required for vulcanization and to improve properties of the vulcanizate. Examples of accelerators include thiazol vulcanization accelerators, such as 2-mercaptobenzothiazol, dibenzothiazyl disulfide, N-cyclohexyl-2-benzothiazyl-sulfenamide (CBS), and the like, and guanidine vulcanization accelerators, such as diphenylguanidine (DPG) and the like. The skilled person will be able to readily select the amount of cure accelerators to achieve the level of desired cure.

Carbon Black

In one or more embodiments, carbon blacks include furnace blacks, channel blacks, and lamp blacks. More specific examples of carbon blacks include super abrasion furnace blacks, intermediate super abrasion furnace blacks, high abrasion furnace blacks, fast extrusion furnace blacks, fine furnace blacks, semi-reinforcing furnace blacks, medium processing channel blacks, hard processing channel blacks, conducting channel blacks, and acetylene blacks.

In particular embodiments, the carbon blacks may have a surface area (EMSA) of at least 20 m$^2$/g and in other embodiments at least 35 m$^2$/g; surface area values can be determined by ASTM D-1765 using the cetyltrimethylammonium bromide (CTAB) technique. The carbon blacks may be in a pelletized form or an unpelletized flocculent form. The preferred form of carbon black may depend upon the type of mixing equipment used to mix the rubber compound.

Silica Dispersing Agent

Exemplary silica dispersing aids suitable for use in the invention include, but are not limited to an alkyl alkoxysilane, a fatty acid ester of a hydrogenated or non-hydrogenated $C_5$ or $C_6$ sugar, a polyoxyethylene derivative of a fatty acid ester of a hydrogenated or non-hydrogenated $C_5$ or $C_6$ sugar, and mixtures thereof, or a mineral or non-mineral additional filler.

Other Ingredients

Other ingredients that are typically employed in rubber compounding may also be added to the rubber compositions. These include accelerators, accelerator activators, oils, plasticizer, waxes, scorch inhibiting agents, processing aids, zinc oxide, tackifying resins, reinforcing resins, fatty acids such as stearic acid, peptizers, and antidegradants such as antioxidants and antiozonants. In particular embodiments, the oils that are employed include those conventionally used as extender oils, which are described above. Useful oils or extenders that may be employed include, but are not limited to, aromatic oils, paraffinic oils, naphthenic oils, vegetable oils other than castor oils, low PCA oils including MES, TDAE, and SRAE, and heavy naphthenic oils.

Ingredient Amounts

In one or more embodiments, the vulcanizable composition, which is the composition resulting from the foregoing mixing steps, may be described with reference to the amounts of the various constituents within the composition. These amounts, which are described herein below, are provided irrespective of the particular step where the ingredient may be introduced.

Rubber

In one or more embodiments, the vulcanizable compositions include at least 20, in other embodiments at least 30, and in other embodiments at least 40 percent by weight of the rubber component, based upon the entire weight of the composition. In these or other embodiments, the vulcanizable compositions include at most 90, in other embodiments at most 70, and in other embodiments at most 60 percent by weight of the rubber component based on the entire weight of the composition. In one or more embodiments, the vulcanizable compositions include from about 20 to about 90, in other embodiments from about 30 to about 70, and in other embodiments from about 40 to about 60 percent by weight of the rubber component based upon the entire weight of the composition.

Silica

In one or more embodiments, the vulcanizable compositions include at least 5, in other embodiments at least 25, and in other embodiments at least 50 parts by weight (pbw) silica per 100 parts by weight rubber (phr). In these or other embodiments, the vulcanizable composition includes at most 200, in other embodiments at most 130, and in other embodiments at most 80 pbw of the silica phr. In one or more embodiments, the vulcanizable composition includes from about 5 to about 200, in other embodiments from about 25 to about 130, and in other embodiments from about 50 to about 80 pbw of silica phr.

Silica Coupling Agent

In one or more embodiments, the vulcanizable compositions include at least 1, in other embodiments at least 2, and in other embodiments at least 5 parts by weight (pbw) silica coupling agent per 100 parts by weight silica. In these or other embodiments, the vulcanizable composition includes at most 20, in other embodiments at most 15, and in other embodiments at most 10 pbw of the silica coupling agent per 100 parts by weight silica. In one or more embodiments, the vulcanizable composition includes from about 1 to about 20, in other embodiments from about 2 to about 15, and in other embodiments from about 5 to about 10 pbw of silica coupling agent per 100 parts by weight silica.

Nicotinamide

As suggested above, a nicotinamide is added in the masterbatch mixing step. Additional nicotinamide may optionally be added during the final mixing step. Therefore, the amounts provided herein, which are representative of the final vulcanizable composition, includes the amount added within the masterbatch mixing step plus any additional amount added in the final mixing step. In one or more embodiments, the vulcanizable compositions include at least 0.5, in other embodiments at least 1.0, and in other embodiments at least 1.5 parts by weight (pbw) nicotinamide per 100 parts by weight rubber (phr). In these or other embodiments, the vulcanizable composition includes at most 3.3, in other embodiments at most 3.0, and in other embodiments at most 2.8 pbw of the nicotinamide phr. In one or more embodiments, the vulcanizable composition includes from about 0.5 to about 3.3, in other embodiments from about 1.0 to about 3.0, and in other embodiments from about 1.5 to about 2.8 pbw of nicotinamide phr.

Carbon Black

In one or more embodiments, the vulcanizable compositions include at least 0, in other embodiments at least 10, and in other embodiments at least 20 parts by weight (pbw) of the first carbon black per 100 parts by weight rubber (phr). In these or other embodiments, the vulcanizable composition includes at most 200, in other embodiments at most 100, and in other embodiments at most 70 pbw of the first carbon black phr. In one or more embodiments, the vulcanizable composition includes from about 0 to about 200, in other embodiments from about 10 to about 100, and in other embodiments from about 20 to about 70 pbw of the first carbon black phr.

Silica Dispersing Agent

In one or more embodiments, the vulcanizable compositions include at least 0, in other embodiments at least 5, and in other embodiments at least 7 parts by weight (pbw) silica dispersing agent per 100 parts by weight silica. In these or other embodiments, the vulcanizable composition includes at most 20, in other embodiments at most 16, and in other embodiments at most 12 pbw of the silica dispersing agent per 100 parts by weight silica. In one or more embodiments, the vulcanizable composition includes from about 0 to about 20, in other embodiments from about 5 to about 16, and in other embodiments from about 7 to about 12 pbw of silica dispersing agent per 100 parts by weight silica.

Mixing Equipment

All ingredients of the rubber compositions can be mixed with standard mixing equipment such as Banbury or Brabender mixers, extruders, kneaders, and two-rolled mills. As suggested above, the ingredients are mixed in two or more stages. In the first stage (i.e., mixing stage), which typically includes the rubber component and filler, is prepared.

Preparation of Tire

The compositions can be processed into tire components according to ordinary tire manufacturing techniques including standard rubber shaping, molding and curing techniques. Typically, vulcanization is effected by heating the vulcanizable composition in a mold; e.g., it may be heated to about 140° C. to about 180° C. Cured or crosslinked rubber compositions may be referred to as vulcanizates, which generally contain three-dimensional polymeric networks that are thermoset. The other ingredients, such as fillers and processing aids, may be evenly dispersed throughout the crosslinked network. Pneumatic tires can be made as discussed in U.S. Pat. Nos. 5,866,171, 5,876,527, 5,931,211, and 5,971,046, which are incorporated herein by reference.

In order to demonstrate the practice of the present invention, the following examples have been prepared and tested. The examples should not, however, be viewed as limiting the scope of the invention. The claims will serve to define the invention.

EXAMPLES

Samples 1-5

In order to demonstrate the practice of the present invention, several vulcanizable compositions were prepared by using the ingredients and mixing order provided in Table I below. As shown in Table I, the vulcanizable compositions were prepared by using two masterbatch mixing steps. A cure system was then added and mixed in a final mixing step. Generally speaking, the amount and location of nicotinamide addition and mixing was varied. Table I also provides the results of some analytical testing that was performed on the compositions and/or vulcanizates prepared therefrom.

TABLE I

| Ingredients | Samples | | | | |
|---|---|---|---|---|---|
| | 1 | 2 | 3 | 4 | 5 |
| First Masterbatch | | | | | |
| Natural Rubber | 10 | 10 | 10 | 10 | 10 |
| Styrene-Butadiene Rubber | 90 | 90 | 90 | 90 | 90 |
| Silica | 56 | 56 | 56 | 56 | 56 |
| Silica Coupling Agent | 4.48 | 4.48 | 4.48 | 4.48 | 4.48 |
| Processing Oil | 1.9 | 1.9 | 1.9 | 1.9 | 1.9 |
| Stearic Acid | 1.5 | 1.5 | 1.5 | 1.5 | 1.5 |
| Wax | 1.5 | 1.5 | 1.5 | 1.5 | 1.5 |
| Nicotinamide | 0 | 1.0 | 3.0 | 0 | 0 |
| Second Masterbatch | | | | | |
| Carbon Black | 10 | 10 | 10 | 10 | 10 |
| Antioxidant | 0.95 | 0.95 | 0.95 | 0.95 | 0.95 |
| Nicotinamide | 0 | 0 | 0 | 1.0 | 3.0 |
| Final Mix | | | | | |
| Sulfur | 2.1 | 2.1 | 2.1 | 2.1 | 2.1 |
| Accelerator | 1.35 | 1.35 | 1.35 | 1.35 | 1.35 |
| Accelerator | 1.5 | 1.5 | 1.5 | 1.5 | 1.5 |
| Accelerator | 0.75 | 0.75 | 0.75 | 0.75 | 0.75 |
| Zinc Oxide | 2 | 2 | 2 | 2 | 2 |
| Analytical Properties Rheometer MDR | | | | | |
| t-50 (min) | 4.67 | 4.57 | 4.3 | 4.51 | 3.24 |
| t-90 (min) | 11.84 | 13.09 | 17.34 | 12.72 | 16.46 |
| RPA (Time_ 2 dNm) | | | | | |
| G' @ 1 min | 70.37 | 66.76 | 61.48 | 68.53 | 64.32 |
| Scorch _SP | 18.57 | 15.41 | 12.28 | 16.64 | 8.82 |
| Lambourne-Type Wear Index | 100 | 105 | 114 | 122 | 121 |

The various mixing steps were performed within a Banbury mixer. During preparation of the first masterbatch, the mixer was operated at 75 rpm and the peak temperature attained by the composition was 160° C. At that point in time, the composition was dropped from the mixer. Upon cooling to a temperature below about 85° C., the composition was then reintroduced to the mixer along with the various other ingredients identified for the second masterbatch. Mixing was continued at 75 rpm, and a peak composition temperature of about 160° C. was attained. The composition was again dropped from the mixer and allowed to cool below a temperature of about 85° C. At this point in time, the composition was then reintroduced to the mixer along with the ingredients identified for the final mix stage. Mixing was continued at 40 rpm at a peak compositional temperature of about 100° C. The composition was then dropped from the mixer and samples were obtained from the composition for purposes of the analytical testing.

Rheometer measurements were taken using an MDR 200 operating at 160° C. RPA measurements were taken using an Alpha Technologies instrument operating at 266° F. Wear was quantified by using tests similar to the Lambourne wear tests, which are described in U.S. Pat. Nos 7,750,087 and 6,939,910, which are incorporated herein by reference. The results the tests were indexed to the control, which was Sample 1.

Samples 6-10

Five additional samples were prepared using procedures and ingredients similar to Samples 1-5, except that a chemically-treated silica, obtained under the tradename Agilon™ 458 (PPG Industries), was used in lieu of silica and silica coupling agent. The ingredients employed, the mix order, and the results of analytical testing are set forth in Table II below.

TABLE II

| Ingredients | Samples | | | | |
|---|---|---|---|---|---|
| | 6 | 7 | 8 | 9 | 10 |
| First Masterbatch | | | | | |
| Natural Rubber | 10 | 10 | 10 | 10 | 10 |
| Styrene-Butadiene Rubber | 90 | 90 | 90 | 90 | 90 |
| Chemically-Treated Silica | 56 | 56 | 56 | 56 | 56 |
| Processing Oil | 1.9 | 1.9 | 1.9 | 1.9 | 1.9 |
| Stearic Acid | 1.5 | 1.5 | 1.5 | 1.5 | 1.5 |
| Wax | 1.5 | 1.5 | 1.5 | 1.5 | 1.5 |
| Nicotinamide | 0 | 1.0 | 3.0 | 0 | 0 |
| Second Masterbatch | | | | | |
| Carbon Black | 10 | 10 | 10 | 10 | 10 |
| Antioxidant | 0.95 | 0.95 | 0.95 | 0.95 | 0.95 |
| Nicotinamide | 0 | 0 | 0 | 1.0 | 3.0 |
| Final Mix | | | | | |
| Sulfur | 2.1 | 2.1 | 2.1 | 2.1 | 2.1 |
| Accelerator | 1.35 | 1.35 | 1.35 | 1.35 | 1.35 |
| Accelerator | 1.5 | 1.5 | 1.5 | 1.5 | 1.5 |
| Accelerator | 0.75 | 0.75 | 0.75 | 0.75 | 0.75 |
| Zinc Oxide | 2 | 2 | 2 | 2 | 2 |
| Analytical Properties Rheometer MDR | | | | | |
| t-50 (min) | 3.08 | 2.64 | 1.83 | 2.25 | 1.75 |
| t-90 (min) | 12.51 | 11.40 | 7.71 | 11.08 | 6.66 |
| RPA (Time_ 2 dNm) | | | | | |
| G' @ 1 min | 73.97 | 72.66 | 68.29 | 73.05 | 68.46 |
| Scorch _SP | 10.11 | 8.66 | 5.46 | 8.94 | 5.42 |
| Lambourne-Type Wear Index | 100 | 98 | 103 | 107 | 110 |

Various modifications and alterations that do not depart from the scope and spirit of this invention will become apparent to those skilled in the art. This invention is not to be duly limited to the illustrative embodiments set forth herein.

What is claimed is:

1. A method for preparing a vulcanizable composition of matter, the method comprising:
   i. mixing, within a first mixing step, a rubber composition to a peak composition temperature of at least 140° C. to thereby form a masterbatch composition, where the rubber composition includes (a) a rubber component, about 5 to about 200 phr silica, and about 1 to about 20 phr silica coupling agent, where the rubber component includes poly(styrene-co-butadiene) and at least one rubber selected from the group consisting of natural rubber, synthetic polyisoprene, polybutadiene, and mixtures thereof;
   ii. allowing the first masterbatch composition to cool;
   iii. adding from about 0.5 to about 3.3 pbw nicotinamide phr to the first masterbatch composition after said step of allowing the first masterbatch composition to cool, and mixing within a second mixing step to a peak composition temperature of at least 140° C. to form a second masterbatch composition;

iv. allowing the second masterbatch composition to cool; and v. adding a curative to the second masterbatch composition and mixing within a final mixing step to a peak composition temperature of at most 130° C.

2. The method of any of the preceding claims, where from about 1.0 to about 3.0 pbw nicotinamide per 100 phr is added in said second mixing step.

3. The method of claim 1, where the first masterbatch includes a chemically-treated inorganic oxide.

4. The method of claim 3, where the chemically-treated inorganic oxide is an amorphous or inorganic oxide.

5. The method of claim 1, where said first mixing step achieves a peak composition temperature of at least 150° C.

6. The method of claim 5, where said second mixing step achieves a peak composition temperature of at least 150° C.

7. The method of claim 6, where said final mixing step achieves a peak composition temperature of at most 110° C.

8. The method of claim 7, further comprising the step of adding carbon black to the first masterbatch after said step of allowing the first masterbatch to cool.

9. The method of claim 8, where the first masterbatch includes a processing oil.

10. The method of claim 9, where the first masterbatch includes a wax.

11. The method of claim 10, where the first masterbatch includes stearic acid.

12. The method of claim 11, further comprising the step of adding an antioxidant to the first masterbatch after said step of allowing the first masterbatch to cool.

* * * * *